United States Patent [19]
Byrne

[11] Patent Number: 6,095,091
[45] Date of Patent: Aug. 1, 2000

[54] PET TRAINING MAT

[75] Inventor: Charles Byrne, Mammoth Lakes, Calif.

[73] Assignee: CB Worlwide, Inc., Mammoth Lakes, Calif.

[21] Appl. No.: 09/159,904

[22] Filed: Sep. 24, 1998

Related U.S. Application Data

[60] Provisional application No. 60/059,933, Sep. 26, 1997.

[51] Int. Cl.[7] .................................................. A01K 15/02
[52] U.S. Cl. ................................ 119/712; 15/215; 52/101
[58] Field of Search ..................................... 119/621, 712; 52/101; 49/58; 43/1; 15/215; 297/219.1

[56] References Cited

U.S. PATENT DOCUMENTS

| | | | |
|---|---|---|---|
| 3,562,086 | 2/1971 | Kantor | 15/215 X |
| 5,270,089 | 12/1993 | Alston et al. | 15/215 X |
| 5,628,079 | 5/1997 | Kizemchuk et al. | 297/219.1 X |

FOREIGN PATENT DOCUMENTS 2185173  7/1987  United Kingdom ........................ 43/1

*Primary Examiner*—Robert P. Swiatek
*Attorney, Agent, or Firm*—Kelly Bauersfeld Lowry & Kelley, LLP

[57] ABSTRACT

A pet training mat for deterring pets and training them to avoid an area deemed desirable to keep pet-free by the pet owner. The pet training mat includes a base having a lower surface and an opposite upper surface, and a plurality of tines which extend upwardly from the upper surface of the base. The tines create an uncomfortable environment for a pet when walking, standing or laying on the pet training mat, without harming the pet, and are distributed over substantially the entire upper surface of the base within the range of four to nine tines per square inch. Each tine includes an upper spike and a riser disposed between the spike and the upper surface of the base. The base may be rigid or formed of a flexible material to conform to the contours of the pet-free area.

17 Claims, 1 Drawing Sheet

PET TRAINING MAT

RELATED APPLICATION

This application claims priority from provisional application Ser. No. 60/059,933 filed Sep. 26, 1997.

BACKGROUND OF THE INVENTION

This invention relates generally to devices utilized to deter pets from going onto or into areas that a pet owner would like the pet to avoid. More specifically, the present invention relates to a pet training mat that incorporates a plurality of tines which provide means for creating an uncomfortable environment for a pet when walking, standing or lying on the pet training mat, without harming the pet.

It is both undesirable and unsanitary for a pet to use furniture designed for humans. Pets leave behind hair, saliva, germs, dirt, fleas, and odors among other things. This problem can be compounded by pet allergies sufferers, people who may dislike pet hair on their clothes, and for the protection of infants in the home. Furthermore pets using furniture have a deleterious effect, and greatly increase wear and tear.

One of the major challenges of pet ownership is training. Millions of dollars and many frustrated hours are spent each year by pet owners attempting to train their pets to behave, and to stay off of the furniture. The traditional manner in which pet owners have tried to control their pets include violence, shouting, throwing tantrums, or other negatively focused disciplinary actions. Even after initial violent actions, the pet may repeatedly disobey the pet owner, leading to further tension and abuse. These confrontations may lead to a poor relationship between the pet owner and the pet. In some cases, the pet owner may not be able to keep the animal, and possible euthanasia could result. In other cases, the pet's personality may develop inadequately, due to abuse, becoming either passive or violent in temperament.

In spite of continued behavior modification struggles between pet owners and pets, pet ownership is increasing in popularity at a rapid pace. The need for safe, economical, and efficient training implements to protect furniture, domestic tranquillity, and the pet's own well being are more important now than ever.

Currently there are several products that are used to deter pets from going onto or into areas that the pet owner would like the pet to avoid. Those products include electronic shocking mats, noise devices and chemical sprays.

The electronic shocking mats are used on surfaces that a person wants to keep pet-free. When the animal enters into the perimeter of the mat, the animal's body creates a connection between electrical currents, and receives a non-lethal electronic shock. This painful shock deters the animal from the area where the mat is placed. There are many problems associated with the electrical shocking mats. One problem is that the shocking mat requires batteries which can become costly over time. Another problem is that the electronic unit cannot be used outside when it rains because the unit will short out. Also the shock given by the electronic mats is very painful. There is no progressive shock level so this standardized approach may prove ineffective on larger animals, and painfully cruel to smaller ones.

Devices that create noises are also used to train pets. When a pet goes onto an area where a noise device is placed, the device will emit a loud noise or snapping sound that will scare/startle the pet away from the area. The problem with such a device is that it is loud and also uncomfortable for the pet owner to hear. Additionally, some of these devices must be reset every time the pet triggers them. Thus, the devices do not work on a full-time basis unless the pet owner constantly resets them.

Chemical sprays are another method of keeping pets off of furniture. Such chemicals emit unpleasant smells causing the pet to avoid the area. Unfortunately these chemicals are also unpleasant to the pet owners. Chemicals may discolor the furniture, cause an allergic reaction from the pet owners, and may be toxic.

Accordingly, there is a need for a device which will condition a pet to avoid predetermined areas in a manner that overcomes the drawbacks noted above that are inherent in the use of electronic shocking mats, noise devices and chemical sprays. Preferably, such a device would train the pet based on paired association learning theory, to have the pet associate the particular pre-determined area with a negative experience, causing the pet to relocate to a more user friendly environment even when the training device is not in use. Such a device should reinforce the positive relationship and benefits of pet ownership and pet welfare by keeping the pet owners role in the training process as passive as possible. Importantly, such a training device must aggressively deter the pet and train it to avoid an area deemed desirable to keep the pet-free by the owner, and yet must not harm the pet in normal use. The present invention fulfills these needs and provides other related advantages.

SUMMARY OF THE INVENTION

The present invention resides in a novel pet training mat which is useful in deterring pets and training them to avoid an area deemed desirable to keep pet-free. The pet training mat comprises, generally, a base having a lower surface and an opposite upper surface, and a plurality of tines extending upwardly from the upper surface of the base. The lower surface of the base typically is placed directly over the pet-free area. The tines provide means for creating an uncomfortable environment for a pet when walking, standing or laying on the pet training mat, without harming the pet.

In a preferred form of the invention, the base is generally planar, and the tines are integrally formed with the base. Moreover, the base includes at least one cut-out area bounded on all sides by adjacent portions of the base. In some cases, the base may be formed of a flexible material to conform to the contours of the pet-free area.

The tines are typically distributed over substantially the entire upper surface of the base within the range of four to nine tines per square inch. A handle may be provided which is defined by a limited area of the upper surface of the base that is free of tines.

Each tine includes an upper spike and a riser disposed between the spike and the upper surface of the base. The riser comprises a plurality of generally cylindrical sections which decrease in diameter between the upper surface of the base and the spike. Preferably, the spike includes an upper rounded point dimensioned to penetrate the hair of the pet to create the desired level of discomfort and yet minimize the possibility of harming the pet.

Other features and advantages of the present invention will become apparent from the following more detailed description, taken in conjunction with the accompanying drawings which illustrate, by way of example, the principles of the invention.

BRIEF DESCRIPTION OF THE DRAWING

The accompanying drawings illustrate the invention. In such drawings.

DETAILED DESCRIPTION OF THE PREFERRED EMBODIMENT

Figure 1:
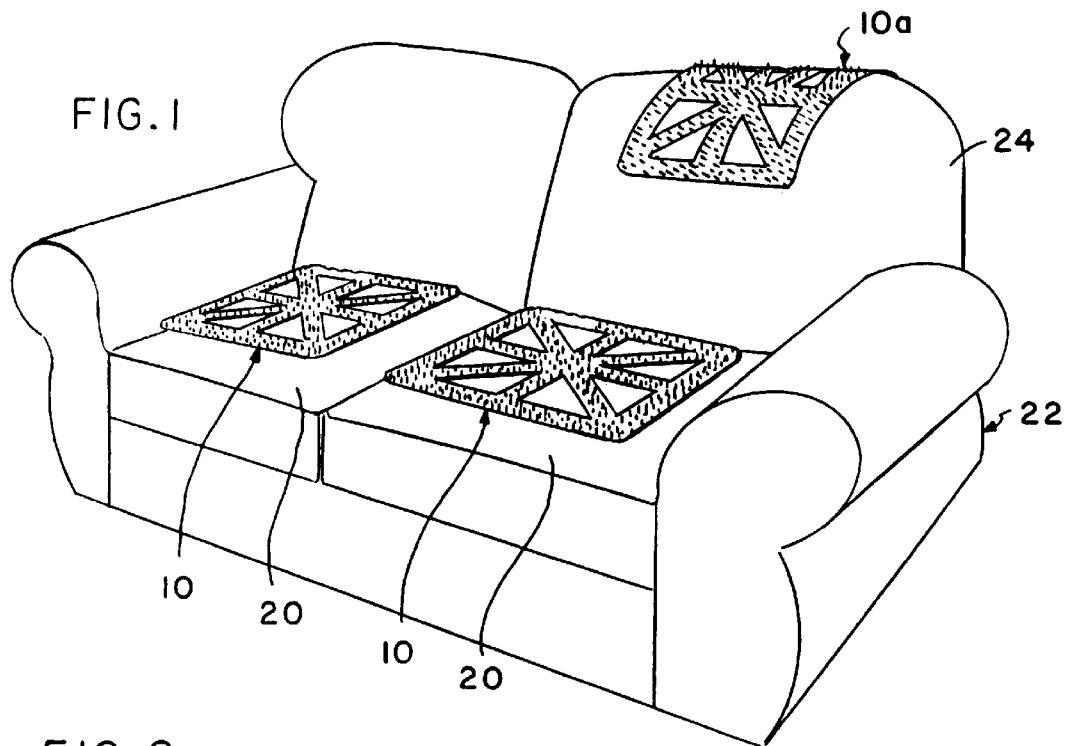
FIG. 1 is a perspective view of a sofa having three pet training mats shown thereon which embody the invention, wherein two training mats are disposed on the upper surface of seat cushions, and a third flexible training mat is disposed over an upper back portion of the sofa and has sufficient flexibility to conform thereto.

As shown in the drawings for purposes of illustration, the present invention is concerned with a pet training mat, generally designated by the reference number 10. The pet training mat 10 is useful in deterring pets and training them to avoid an area deemed desirable to keep pet-free, and comprises a base 12 having a lower surface 14 and an opposite upper surface 16, and a plurality of tines 18 which extend upwardly from the upper surface 16 of the base 12. The lower surface 14 of the base 12 is typically placed directly over the pet-free area which may be, as illustrated in FIG. 1, the seat cushions 20 of a sofa 22, or the seat back 24. When so placed, the tines 18 provide means for creating an uncomfortable environment for a pet when walking, standing or lying on the pet training mat 10 without harming the pet.

In a preferred form of the invention, the pet training mat 10 is made of plastic in assorted sizes to cover household and automotive furniture such as chairs, sofas, couches, tables and car seats. The training mat 10 may also be used on counter tops, beds, and other areas that pets should avoid, as well as on car bodies such as car hoods to deter animals from walking on the car body leaving unwanted footprints and scratches.

The pet training mat 10 may be produced in several styles. One such style is square approximately 18"×18" made from rigid plastic. Another style is in flexible sheet form approximately 18"×18" to 18"×60". The smaller rigid mats 10 are easy to handle and are cosmetically appealing. Multiple small size mats may be used to cover larger areas such as a whole sofa 22. The flexible mats may be desirable under certain circumstances since they can cover larger areas such as a whole sofa seating area. The flexible mats can also be rolled up or folded for easy storage.

The tines 18 are preferably distributed over substantially the entire upper surface 16 of the base 12 within the range of four to nine tines per square inch. On the exemplary pet training mat 10 shown in FIG. 2, a handle 26 is provided which is defined by a limited area of the upper surface 16 of the base 12 that is free of tines 18.

Figure 3:
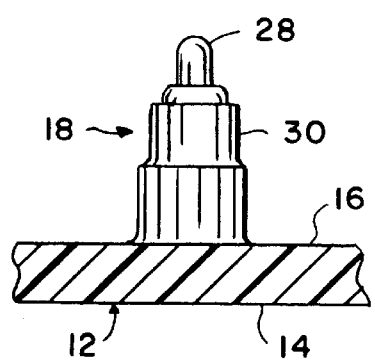
FIG. 3 is an enlarged partially sectional and elevational view illustrating the contour of a tine which extends upwardly from an upper surface of a base of the pet training mat.

With reference to FIG. 3, each tine 18 includes an upper spike 28 and a riser 30 which is disposed between the spike 28 and the upper surface 16 of the base 12. The riser 30 comprises a plurality of generally cylindrical sections which decrease in diameter between the upper surface 16 of the base 12 and the spike 28. Moreover, the spike 28 is formed to include an upper rounded point.

When the pet training mat 10 is to be used primarily with cats and small dogs, the tines 18 are preferably approximately 3/16" to 1/4" in height by approximately 1/8" thick at the base or bottom portion of the riser 30. Such construction allows the tine 18 to extend into the hair of the pet which will enable the rounded point of the spike 28 to reach the actual skin of the pet to cause discomfort. If the tine 18 is too thick, it will not find its way through the pet hair and thus it will not be effective in causing discomfort. If too thin and sharp, the tine 18 may puncture the pet's skin.

Figure 2:
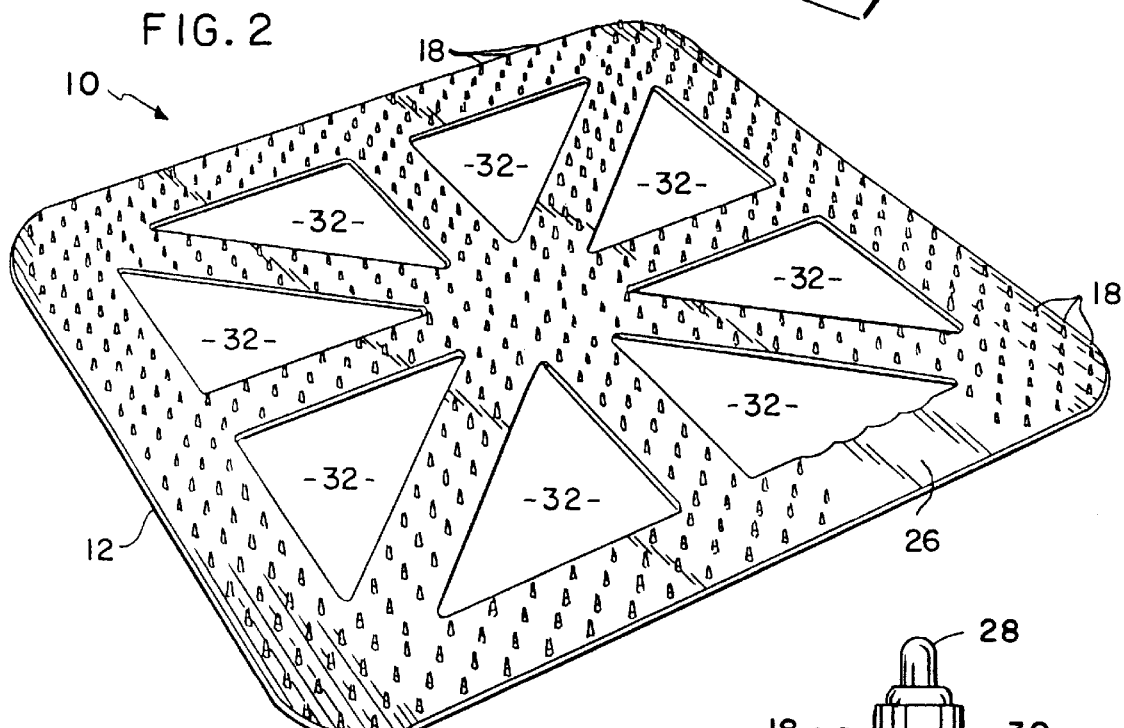
FIG. 2 is a top and side perspective view of the pet training mats illustrated in FIG. 1.

As illustrated in FIGS. 1 and 2, the base 12 is generally planar, and the tines 18 are integrally formed with the base. The base 12 includes several cut-out areas 32 which are bounded on all sides by adjacent portions of the base 12. The pet training mat 10a of FIG. 1 is identical in all respects to the other pet training mats 10 shown, with the exception that the base 12 is formed of a flexible material to conform to the contours of the pet-free area.

The rigid mats 10 and 10a may be injection molded or cut from extruded sheet material. The flexible mats 10a may be extruded from vinyl and then either cut by hand or clicker/punch press using cutting dies. The mats 10 and 10a may be made from plastic such as vinyl, clarified polypropylene, polyethylene, acrylic, or similar material, and be either clear or opaque-colored. They can be in solid sheet forms or they can have the cut-outs 32 as shown. The illustrated mat 10 with cut-outs 32 makes it so, when the pet lies on the mat, a portion of its body will go through the cut-out area 32, creating more pressure and discomfort on the body parts that are touching the tines. On the other hand, a continuous sheet with uniformly disposed tines 18 provides that the pet's body is dispersed over all the tines 18, thus reducing discomfort. However, the cut-out version uses less plastic, which in effect reduces manufacturing costs. The injection molded method is preferable since the final product is more appealing than an extruded product, lower manufacturing cost, and there is minimal secondary work required to finish the mat 10. Also, when injection molded, added features such as a handle area 26 and product logo can be easily manufactured into the product.

In use, the training mat 10 or 10a with the tines 18 upward is placed in the desired "pet-free zone". When the pet walks, stands, or lays on the mat, the tines 18 create an uncomfortable environment for the pet. Due to the uncomfortable sensation, the pet no longer wishes to be in the matted area. The pet then leaves the area and associates that area as being uncomfortable, therefore it does not want to return. In some cases, occasional reinforcement is advised by replacing the mat 10 or 10a back in an area where the pet might return. Over time, the pet will eventually learn that he/she is not allowed into that particular area.

Based on the paired association learning theory, the training mat 10 or 10a will condition the pet to avoid the furniture where the product is deployed. The pet will associate that particular area with a negative experience thus the pet will relocate to a more user friendly environment. This process is particularly effective with younger pets, as they are more susceptible to training through behavior modification devices. It is harder to teach an old dog a new trick. Since the mat 10 or 10a may be manufactured to blend in with the furniture, particularly with the clear plastic material, the pet associates its former discomfort with the furniture.

Modifying a pet's behavior using this type of aversion therapy is a very attractive alternative for the pet owner, and for the overall relationship between pet and pet owner. The training mat 10 or 10a takes the place of a potentially abusive power struggle between man and pet. After all, the pet owner/pet relationship is meant to be a positive friendly experience. Using the training mat 10 or 10a is an attractive behavior conditioning method that reinforces the positive relationship and benefits of pet ownership and pet welfare.

Although a particular embodiment of the invention has been described in detail for purposes of illustration, various modifications may be made without departing from the spirit and scope of the invention. Accordingly, the invention is not to be limited, except as by the appended claims.

I claim:

1. A pet training mat useful in deterring pets and training them to avoid an area deemed desirable to keep pet-free, comprising:

a base having a lower surface and an opposite upper surface, the lower surface capable of being placed directly over the pet-free area; and a plurality of tines extending upwardly from the upper surface of the base, each tine including an upper spike and a riser disposed between the spike and the upper surface of the base, the riser comprising a plurality of generally cylindrical sections which decrease in diameter between the upper surface of the base and the spike, wherein the tines provide means for creating an uncomfortable environment for a pet when walking, standing or laying on the pet training mat, without harming the pet.

2. The pet training mat of claim 1, wherein the tines are distributed within the range of four to nine tines per square inch of the upper surface of the base.

3. The pet training mat of claim 2, wherein the tines are distributed over substantially the entire upper surface of the base.

4. The pet training mat of claim 3, including a handle defined by a limited area of the upper surface of the base that is free of tines.

5. The pet training mat of claim 1, wherein the spike includes an upper rounded point.

6. The pet training mat of claim 1, wherein the base is generally planar, and the tines are integrally formed with the base.

7. The pet training mat of claim 6, wherein the base includes at least one cut-out area bounded on all sides by adjacent portions of the base.

8. The pet training mat of claims 6, wherein the base is flexible to conform to the contours of the pet-free area.

9. A pet training mat useful in deterring pets and training them to avoid an area deemed desirable to keep pet-free, comprising:

a generally planar base having a lower surface and an opposite upper surface, the lower surface capable of being placed directly over the pet-free area; and a plurality of tines integrally formed with the base and extending upwardly from the upper surface of the base, the tines being distributed over substantially the entire upper surface of the base within the range of four to nine tines per square inch, wherein each tine includes an upper spike having an upper rounded point and a riser disposed between the spike and the upper surface of the base, the riser comprising a plurality of generally cylindrical sections which decrease in diameter between the upper surface of the base and the spike, to provide means for creating an uncomfortable environment for a pet when walking, standing or laying on the pet training mat, without harming the pet.

10. The pet training mat of claim 9, including a handle defined by a limited area of the upper surface of the base that is free of tines.

11. The pet training mat of claim 9, wherein the base includes at least one cut-out area bounded on all sides by adjacent portions of the base.

12. The pet training mat of claim 11, wherein the base is flexible to conform to the contours of the pet-free area.

13. A pet training mat useful in deterring pets and training them to avoid an area deemed desirable to keep pet-free, comprising:

a base having a lower surface and an opposite upper surface, the lower surface capable of being placed directly over the pet-free area;

a plurality of tines extending upwardly from the upper surface of the base, the tines being distributed over substantially the entire upper surface of the base; and at least one cut-out area bounded on all sides by adjacent portions of the base having tines extending upwardly therefrom, wherein the tines provide means for creating an uncomfortable environment for a pet when walking, standing or laying on the pet training mat, without harming the pet.

14. The pet training mat of claim 13, wherein the base is generally planar, and the tines are integrally formed with the base and distributed within the range of four to nine tines per square inch of the upper surface of the base so as to penetrate the pet's hair.

15. The pet training mat of claim 14, wherein each tine includes an upper spike having an upper rounded point and a riser disposed between the spike and the upper surface of the base, the riser comprising a plurality of generally cylindrical sections which decrease in diameter between the upper surface of the base and the spike.

16. A pet training mat useful in deterring pets and training them to avoid an area deemed desirable to keep pet-free, comprising:

a generally planar flexible base having a lower surface and an opposite upper surface, the lower surface capable of being placed directly over the pet-free area and conforming thereto;

a plurality of tines integrally formed with the base and extending upwardly from the upper surface of the base, each tine including an upper spike and a riser disposed between the spike and the upper surface of the base; and at least one cut-out area bounded on all sides by adjacent portions of the base having tines extending upwardly therefrom, wherein the tines provide means for creating an uncomfortable environment for a pet when walking, standing or laying on the pet training mat, without harming the pet.

17. The pet training mat of claim 16, wherein the tines are distributed over substantially the entire upper surface of the base within the range of four to nine tines per square inch of the upper surface of the base so as to penetrate the pet's hair.

* * * * *